(12) United States Patent  
Thornton (10) Patent No.: US 7,716,638 B2
(45) Date of Patent: May 11, 2010

(54) METHODS FOR DESCRIBING PROCESSOR FEATURES

(75) Inventor: Andrew J. Thornton, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1245 days.

(21) Appl. No.: 11/072,913

(22) Filed: Mar. 4, 2005

(65) Prior Publication Data

US 2006/0200663 A1 Sep. 7, 2006

(51) Int. Cl.
*G06F 9/44* (2006.01)
*G06F 9/45* (2006.01)
*G06F 15/76* (2006.01)
*G06F 9/30* (2006.01)
*G06F 7/38* (2006.01)
*G06F 9/46* (2006.01)

(52) U.S. Cl. .................. 717/121; 717/149; 717/153; 712/15; 712/43; 712/228; 712/229; 718/108

(58) Field of Classification Search .............. None
See application file for complete search history.

(56) References Cited

U.S. PATENT DOCUMENTS

| | | | | |
|---|---|---|---|---|
| 5,825,649 A | * | 10/1998 | Yoshimura | 700/82 |
| 5,961,642 A | * | 10/1999 | Lewis | 713/1 |
| 6,061,709 A | * | 5/2000 | Bronte | 718/103 |
| 6,253,317 B1 | * | 6/2001 | Knapp et al. | 712/244 |
| 6,981,135 B1 | * | 12/2005 | Trask | 713/1 |
| 7,076,647 B2 | * | 7/2006 | Roth et al. | 713/100 |
| 7,130,977 B1 | * | 10/2006 | Christie et al. | 711/163 |
| 7,478,394 B1 | * | 1/2009 | de Dinechin et al. | 718/108 |
| 2005/0049985 A1 | * | 3/2005 | Mangasarian et al. | 706/45 |
| 2005/0076186 A1 | * | 4/2005 | Traut | 712/1 |
| 2005/0149919 A1 | * | 7/2005 | Rothman et al. | 717/162 |
| 2005/0273571 A1 | * | 12/2005 | Lyon et al. | 711/203 |
| 2006/0031060 A1 | * | 2/2006 | Weissmann | 703/27 |
| 2006/0069878 A1 | * | 3/2006 | Aguilar et al. | 711/147 |
| 2006/0101470 A1 | * | 5/2006 | Swanberg | 718/105 |
| 2006/0136653 A1 | * | 6/2006 | Traut et al. | 711/6 |
| 2007/0244941 A1 | * | 10/2007 | Reed et al. | 707/205 |

* cited by examiner

*Primary Examiner*—Tuan Q Dam
*Assistant Examiner*—Isaac T Tecklu
(74) *Attorney, Agent, or Firm*—Woodcock Washburn LLP (57) ABSTRACT

A machine readable description of a new feature of a processor is provided by a processor vendor. Control code executing on a processor, such as a traditional operating system kernel, a partitioning kernel, or the like can be programmed to receive the description of the feature and to use information provided by the description to detect, enable and manage operation of the new feature.

17 Claims, 10 Drawing Sheets

```
typedef struct _FEATURE_BLOB
{
    UINT32 Version;
    UINT32 Size;

UCHAR VendorString[12];    // as returned by CPUID(0).EBX:ECX:EDX
    UINT32 ModelCount;
    PROCESSOR_ID_MATCH Model[];

} FEATURE_BLOB, *PFEATURE_BLOB;
```

FIG. 5a

```
typedef struct _PROCESSOR_ID_MATCH
{
    UINT32 FamilyModelStepping;        // as returned by CPUID(1).EAX
    UINT32 FamilyModelSteppingMask;
    UINT32 FamilyModelSteppingMatch;

} PROCESSOR_ID_MATCH, *PPROCESSOR_ID_MATCH;
```

FIG. 5b

```
typedef struct _FEATURE_HEADER
{
    FEATURE_SECTION_TYPE Type;
    UINT32 Version;
    UINT32 Size;

} FEATURE_HEADER, *PFEATURE_HEADER;

typedef enum _FEATURE_SECTION_TYPE
{
    FeatureDiscovery,
    FeatureEnable,
    FeatureDisable,
    FeatureRegisters,
    FeatureSignature,
    FeatureAdvertise,

} FEATURE_SECTION_TYPE, *PFEATURE_SECTION_TYPE;
```

FIG. 6

```
typedef struct _CPUID_MATCH
{
    UINT32 Leaf;  - value in EAX when CPUID issued // Mask and Match values over CPUID(Leaf).EAX,EBX,ECX,EDX UINT32 EaxMask;
    UINT32 EaxMatch;
    UINT32 EbxMask;
    UINT32 EbxMatch;
    UINT32 EcxMask;
    UINT32 EcxMatch;
    UINT32 EdxMask;
    UINT32 EcxMatch;

} CPUID_MATCH, *PCPUID_MATCH;
```

FIG. 7a

```
typedef enum _ADDRESS_SPACE
{
    ControlRegisters,
    ModelSpecificRegisters,
    LocalApicRegisters    // Memory offsets relative to APIC_BASE_MSR

} ADDRESS_SPACE, *PADDRESS_SPACE;
```

FIG. 7b

```
typedef struct _BITS64
{
    UINT64 Mask;
    UINT64 Match;

} BITS64, *PBITS64;
```

FIG. 7c

```
typedef struct _REGISTER_BITS64
{
    ADDRESS_SPACE AddressSpace;
    UINT32 RegisterNumber;
    BITS64 Bits;

} REGISTER_BITS64, *PREGISTER_BITS64;
```

FIG. 7d

```
typedef struct _FEATURE_DISCOVERY
{
    FEATURE_HEADER Feature;

CPUID_MATCH CpuidMatch;

UINT32 RegisterCount;
    REGISTER_BITS64 Registers[]; // Registers will be checked in this order

} FEATURE_DISCOVERY, *PFEATURE_DISCOVERY;
```

FIG. 8

```
typedef struct _FEATURE_ENABLE
{
    FEATURE_HEADER Feature;

UINT32 EnableRegisterCount;
    REGISTER_BITS64 EnableRegisters[]; // Registers will be enabled
                                       // in this order and will be
                                       // disabled in reverse order
                                       // of no disable section is present.
} FEATURE_ENABLE, *PFEATURE_ENABLE;
```

FIG. 9a

```
typedef struct _FEATURE_DISABLE
{
    FEATURE_HEADER Feature;

UINT32 DisableRegisterCount;
    REGISTER_BITS64 DisableRegisters[]; // Registers will be disabled
                                        // in this order
} FEATURE_DISABLE, *PFEATURE_DISABLE;
```

FIG. 9b

```
typedef struct _FEATURE_REGISTERS
{
    FEATURE_HEADER Feature;

UINT32 RegisterCount;
    FEATURE_REGISTER Registers[];  // Saves are done in the order specified,
                                   // restores in the reverse order

} FEATURE_REGISTERS, *PFEATURE_REGISTERS;
```

FIG. 10a

```
typedef struct _FEATURE_REGISTER
{
    ADDRESS_SPACE AddressSpace;
    UINT32 RegisterNumber;

UINT64 RegisterBitsMask;    // Indicates bits of the register
                                //   related to feature
    UINT64 UntrustedReadMask;   // Indicates bits untrusted code
                                //   shouldn't read
    UINT64 UntrustedWriteMask;  // Indicates bits untrusted code
                                //   shouldn't write UINT32 SwitchWithThread:1;     // Indicates the register state should
                                   // be context switched with the thread
    UINT32 SwitchWithProcessor:1;  // or partition.
                                   // Thread switch implies partition
                                   // switch.

UINT32 LazyProcessorSwitchOk:1; // Indicates registers have no runtime
                                    // side effects and can be lazily
                                    // switched when accessed.

} FEATURE_REGISTER, *PFEATURE_REGISTER;
```

FIG. 10b

```
typedef struct _FEATURE_ADVERTISE
{
    //
    // Globally Unique ID used by software to identify the feature.
    // It could also be used to find an internationalized friendly
    // name.
    //
    GUID FeatureGUID;

//
    // NUL terminated string used to describe the feature in UI if
    // a locale specific one can't be found.
    //
    UCHAR FeatureFriendlyName[256];

} FEATURE_ADVERTISE, *PFEATURE_ADVERTISE;
```

FIG. 11

```
//
// All errors are reported using GetLastError()
//

BOOL
CheckForProcessorFeature(
    IN GUID FeatureGuid,
    OUT PBOOL FeaturePresent
    );

//
// Enable and Disable apply to the current thread
//
BOOL
EnableProcessorFeature(
    IN GUID FeatureGuid
    );

BOOL
DisableProcessorFeature(
    IN GUID FeatureGuid
    );
```

FIG. 12

```
NTSTATUS
KeCheckForProcessorFeature(
    IN PKTHREAD Thread,        // Threads are 32 or 64 bit and
    IN GUID FeatureGuid,       // some features may also be.
    OUT PBOOLEAN FeaturePresent
    );

NTSTATUS
KeEnableProcessorFeature(
    IN PKTHREAD Thread,
    IN GUID FeatureGuid
    );

NTSTATUS
KeDisableProcessorFeature(
    IN PKTHREAD Thread,
    IN GUID FeatureGuid
    );
```

METHODS FOR DESCRIBING PROCESSOR FEATURES

FIELD OF THE INVENTION

The present invention relates to processors used in computing systems, and more particularly, to a method for providing a machine readable description of a new feature implemented in a given model or family of processors to enable a computing system to detect, enable and manage operation of the new feature without any a priori knowledge of it.

BACKGROUND

Microprocessor vendors typically develop a family of processors designed around a given processor architecture and then continuously evolve the architecture. For example, Intel Corporation has developed several generations of processors around its x86 architecture, the most recent being the PENTIUM® family of microprocessors. Similarly, Advanced Micro Devices, Inc. has developed families of processors designed around its x64 architecture. Often a processor vendor will add a feature to an existing model or family of processors. Examples of new features that have been added to a processor family include the Physical Address Extension (PAE), MMX instructions, and streaming SIMD extensions (SSE) features added to the PENTIUM® family of processors.

Features that add additional bits to existing registers within a processor, that add new registers to the processor, or that require additional processor state to be saved and restored across processor context switches can be problematic for both processor vendors and developers of operating systems designed to execute on such a processor. In particular, in order for an operating system to use such a feature or to make such a feature available to application programs, the kernel of the operating system must be modified to support the new feature. This is true of both traditional operating system kernels, such as the kernel of the WINDOWS® operating system available from Microsoft Corporation, and so-called partitioning kernels that provide partitioned execution environments for multiple "guest" operating systems. Because these kinds of new features require support in the kernel, the introduction of such a feature by a processor vendor is effectively gated on the release of an updated version of the kernel.

The existence of new features in a processor presents additional problems for partitioning kernels. A partitioning kernel provides a separate, partitioned execution environment for each of multiple "guest" operating systems running on a single computing system. While each operating system runs in a separate partition, it appears to each operating system that it has full control of the underlying processor and other system components. In reality, the partitioning kernel presents one or more separate, virtualized processors to each operating system. It is important in such a system to prevent secrets from leaking between partitions and to prevent one partition from corrupting the state of another partition. However, if a new feature has been implemented in a processor on which the partitioning kernel is running and that feature adds new registers or additional bits to existing registers or adds to the processor state that must be saved during a context switch from one partition to another, the potential to leak secrets between partitions or for one partition to corrupt the state of another exists. Thus, it is particularly important for a partitioning kernel to be aware of any such new feature.

Thus, there is a need for a mechanism by which a processor vendor can make information concerning a new feature of a processor available to a computing system so that the system can detect, enable and manage operation of the new feature. The present invention satisfies this need.

SUMMARY OF THE INVENTION

The present invention is directed to a machine readable description of a new feature of a processor, as embodied in a computer readable medium, a method of generating same, and a method of using the machine readable description to detect, enable and manage operation of the feature in a computing system. Control code executing on a processor, such as a traditional operating system kernel, a partitioning kernel, or the like can be programmed to receive the description of the feature and to use information provided by the description to detect, enable and manage operation of the new feature. With the present invention, a processor vendor can implement new features in successive releases of a processor model without requiring a kernel vendor to release a corresponding update to the kernel software with each new processor release. Instead, a machine readable description of a new feature can provide the information necessary for the kernel to support the feature.

In one embodiment, the machine readable description of the feature comprises a section that stores information that identifies a type of processor in which the feature is implemented and another section containing information that can be processed to detect presence of the feature within a processor of the identified type. The description may also comprise another section that stores information that can be processed to enable operation of the feature within a processor of the identified type. The description may further comprise another section that stores information that can be processed to disable operation of the feature within a processor of the identified type. The description may also comprise a section that stores information identifying state within a processor of the identified type that is associated with the feature. Such information may further identify whether the state must be saved prior to the processor switching context between two threads of execution or switching context between two virtual processors in a system employing a partitioning kernel. The description may further comprise a section that stores an identifier associated with the feature and a textual description of the feature, as well as a section that stores a digital signature computed over at least a portion of the description. The signature can be processed to confirm the provenance of the description.

Other features of the present invention will become evident hereinafter.

BRIEF DESCRIPTION OF THE DRAWINGS

The foregoing summary and the following detailed description of the invention are better understood when read in conjunction with the appended drawings. Exemplary embodiments of the invention are shown in the drawings, however it is understood that the invention is not limited to the specific methods and instrumentalities depicted therein. In the drawings.

DETAILED DESCRIPTION OF THE INVENTION

The present invention is directed to a machine readable description of a new feature of a processor, a method of generating same, and a method of using the machine readable description to detect, enable and manage operation of the feature in a computing system. An operating system kernel, a partitioning kernel, or the like can be programmed to receive the description of the feature and to use information provided by the description to detect, enable and manage operation of the new feature. With the present invention, a processor vendor can implement new features in successive releases of a processor model without requiring a kernel vendor to release a corresponding update to the kernel software with each new processor release. Instead, a machine readable description of a new feature can provide the information necessary for the kernel to support the feature.

Exemplary Computing Systems

Figure 1:
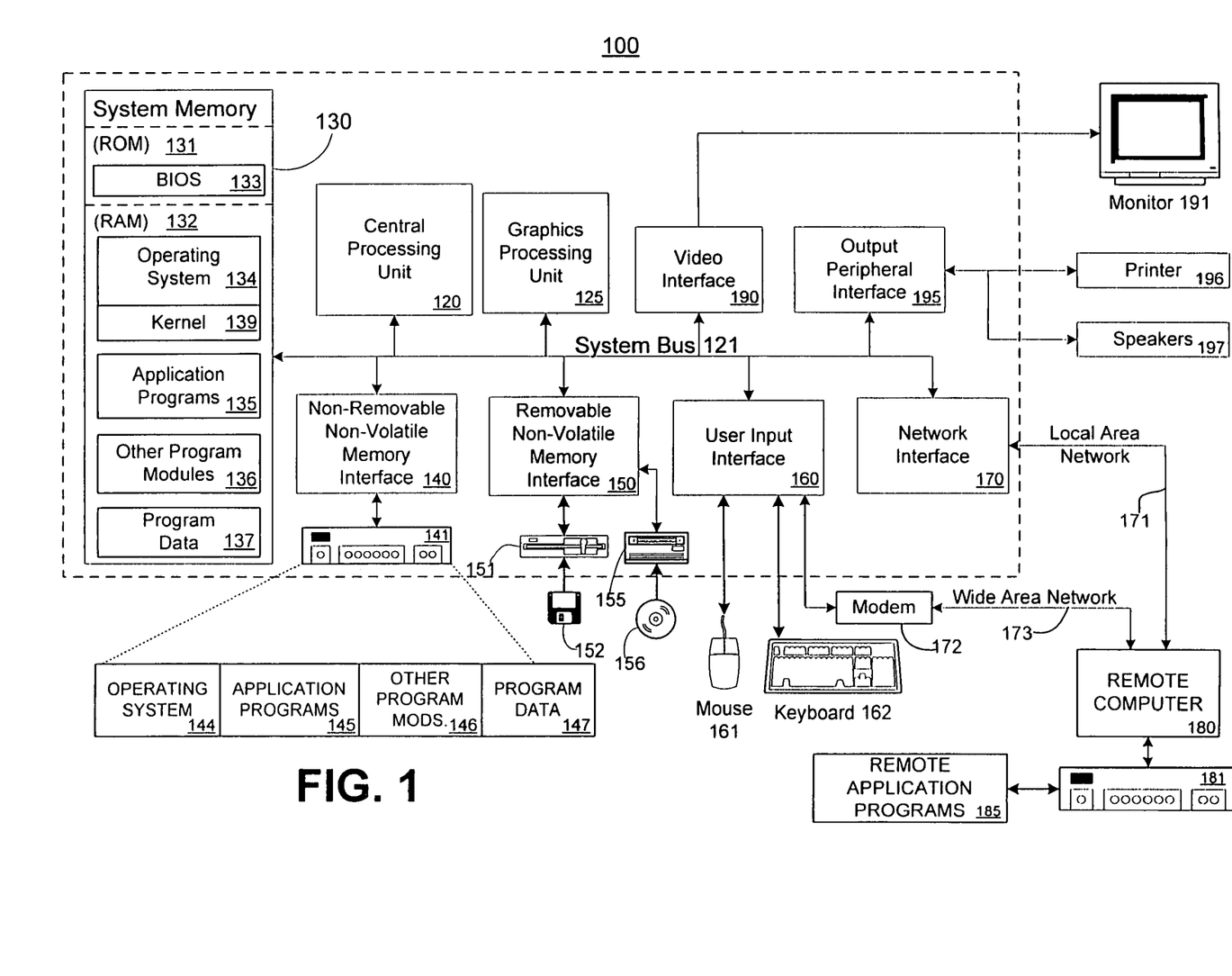
FIG. 1 is a block diagram of an exemplary computing system in which aspects of the present invention may be practiced.

FIG. 1 illustrates the functional components of one example of a computing system 100 in which aspects of the present invention may be embodied or practiced. As used herein, the terms "computing system," "computer system," and "computer" refer to any machine, system or device that comprises a processor capable of executing or otherwise processing program code and/or data. Examples of computing systems include, without any intended limitation, personal computers (PCs), minicomputers, mainframe computers, thin clients, network PCs, servers, workstations, laptop computers, hand-held computers, programmable consumer electronics, multimedia consoles, game consoles, satellite receivers, set-top boxes, automated teller machines, arcade games, mobile telephones, personal digital assistants (PDAs) and any other processor-based system or machine. The terms "program code" and "code" refer to any set of instructions that are executed or otherwise processed by a processor. The term "program module" refers to program code and/or data in the form of routines, programs, objects, components, data structures and the like that perform particular functions or implement particular data types. The term "data structure" refers to an organization of pieces of information or data. Examples of data structures include but are not limited to files, lists, arrays, records, trees, objects and tables. A data structure can comprise a single structure having a plurality of sections or fields of information or can comprise a collection of separate pieces of information organized in some manner. The term "kernel" refers to any form of code executing on a processor to control the operation of a computing system, including without limitation traditional operating system kernels, such as the kernels of the WINDOWS® family of operating systems available from Microsoft Corporation, the kernel of the MACINTOSH® operating system available from Apple Computer, Inc. and the LINUX kernel, as well as partitioning kernels discussed below and illustrated in FIG. 2.

Referring to FIG. 1, the exemplary computing system 100 comprises a central processing unit 120, a graphics processing unit 125, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computing system 100 may include a variety of computer readable media. Computer readable media can be any available media that can be accessed by computing system 100 and includes both volatile and nonvolatile, removable and non-removable media. By way of example, and not limitation, computer readable media may comprise both computer storage media and communication media. Computer storage media includes both volatile and nonvolatile, removable and non-removable media implemented in any method or technology for storage of information or data. Computer storage media includes, but is not limited to, random access memory (RAM), read-only memory (ROM), Electrically-Erasable Programmable Read-Only Memory (EEPROM), flash memory or other memory technology, memory cards, memory sticks, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computing system 100. Communication media typically a carrier wave or other transport mechanism or signal that is modulated to transmit information, including program code and data, from one location to another. The term "modulated signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above are also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computing system 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. The operating system may comprise a kernel 139. RAM 132 may contain other data and/or program code as well.

The computing system 100 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM, DVD or other optical media. The computing system 100 may also incorporate various means for writing to and reading from any of the other forms of computer readable media described above. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of program code, data structures, program modules and other data for the computing system 100. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computing system 100 through input devices such as a keyboard 162 and pointing device 161, commonly referred to as a mouse, trackball or touch pad. Other input devices (not shown) may include a microphone, joystick, game pad, satellite receiver, scanner, or the like. These and other input devices are often connected to the processing unit 120 through a user input interface 160 that is coupled to the system bus 121, but may be connected by other interfaces and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computing system 100 may operate in a networked environment using logical connections to one or more remote computers, such as a remote computer 180. The remote computer 180 may be a personal computer, a server, a router, a network PC, a peer device or any other type of computing system, and typically includes many or all of the elements described above relative to the computing system 100, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computing system 100 is connected to the LAN 171 through a network interface or adapter 170. When used in a WAN networking environment, the computing system 100 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computing system 100, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
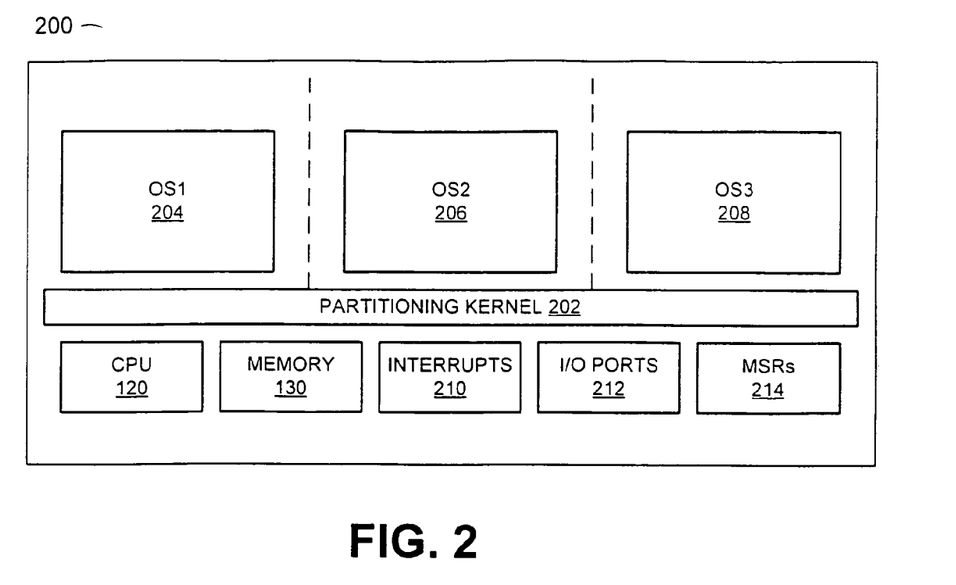
FIG. 2 is a block diagram of another exemplary computing system in which aspects of the present invention may be practice.

FIG. 2 is a block diagram illustrating another exemplary computing system 200 in which aspects of the present invention may be embodied or practiced. The computing system 200 comprises a partitioning kernel 202 that provides a separate, partitioned execution environment for each of multiple "guest" operating systems (e.g., 204, 206 and 208) running on the same processor 120. Each guest operating system can be a different operating system or can be a different instance of the same operating system. Other than the partitioning kernel 202, the computing system 200 may generally comprise the same system components as the computing system 100 of FIG. 1. While each guest operating system runs in a separate partition, it appears to each operating system that it has full control of the underlying processor 120 and other components of the system, such as the memory 130, interrupts 210, input/output ports 212, and model specific registers (MSRs) 214 which are shown separately but which are part of the processor 120. In reality, the partitioning kernel presents one or more separate, virtualized processors together with some or all of the computing environment described in FIG. 1 to each operating system 204, 206 and 208. It is important in such a system to prevent secrets from leaking between partitions and to prevent one partition from corrupting the state of another partition. However, as mentioned above, if a new feature has been implemented in new release of the processor 120 on which the partitioning kernel is running and that feature adds new registers or additional bits to existing registers or adds to the processor state that must be saved during a context switch from one partition to another, the potential to leak secrets between partitions or for one partition to corrupt the state of another exists. Thus the partitioning kernel is forced to disallow guest access to any registers or bits within registers that are not defined when it is written. It is therefore particularly important for a partitioning kernel to be aware of any such new feature as it gates their availability to any guest operating system.

Figure 3:
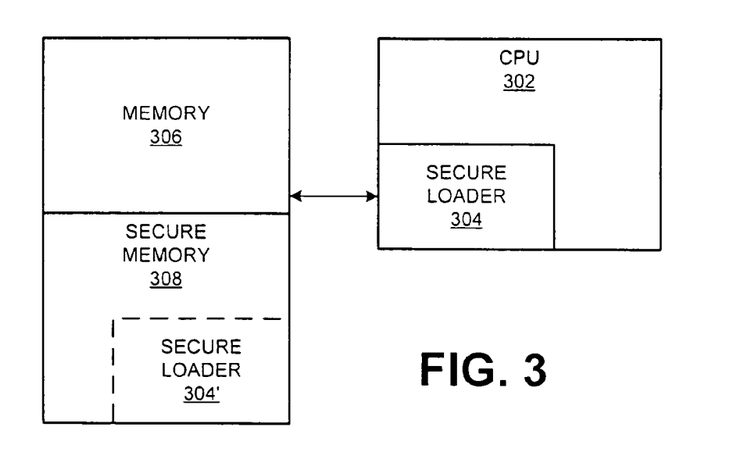
FIG. 3 is a block diagram of yet another exemplary computing system in which aspects of the present invention may be practiced.

FIG. 3 is a block diagram illustrating at least a portion of yet another exemplary computing system 300 in which aspects of the present invention may be embodied or practiced. Again, although not shown in FIG. 3, the computing system 300 may generally comprise all or some of the same components as the computing systems 100, 200 shown in FIGS. 1 and 2. As shown, in this system, program code that implements a loader function 304 may be executed from within secure storage in the processor 302 itself. Alternatively, a secure loader 304' (shown in dashed lines) may be executed from a secure region 308 of the system memory that is protected from modification. In either case, the secure loader (304 or 304') cannot be tampered with and is considered part of the trusted computing base. The secure loader (304 or 304') functions to load other code from a memory 306 during boot-up of the computing system, such as code to carry out the boot-up process or code comprising all or part of an operating system, so that the loaded code can be executed by the processor. As described hereinafter, the process of loading a machine readable description of a new processor feature and confirming its provenance in accordance with an aspect of the present invention may be implemented as part of a secure loader, such as secure loader 304.

Figure 4:
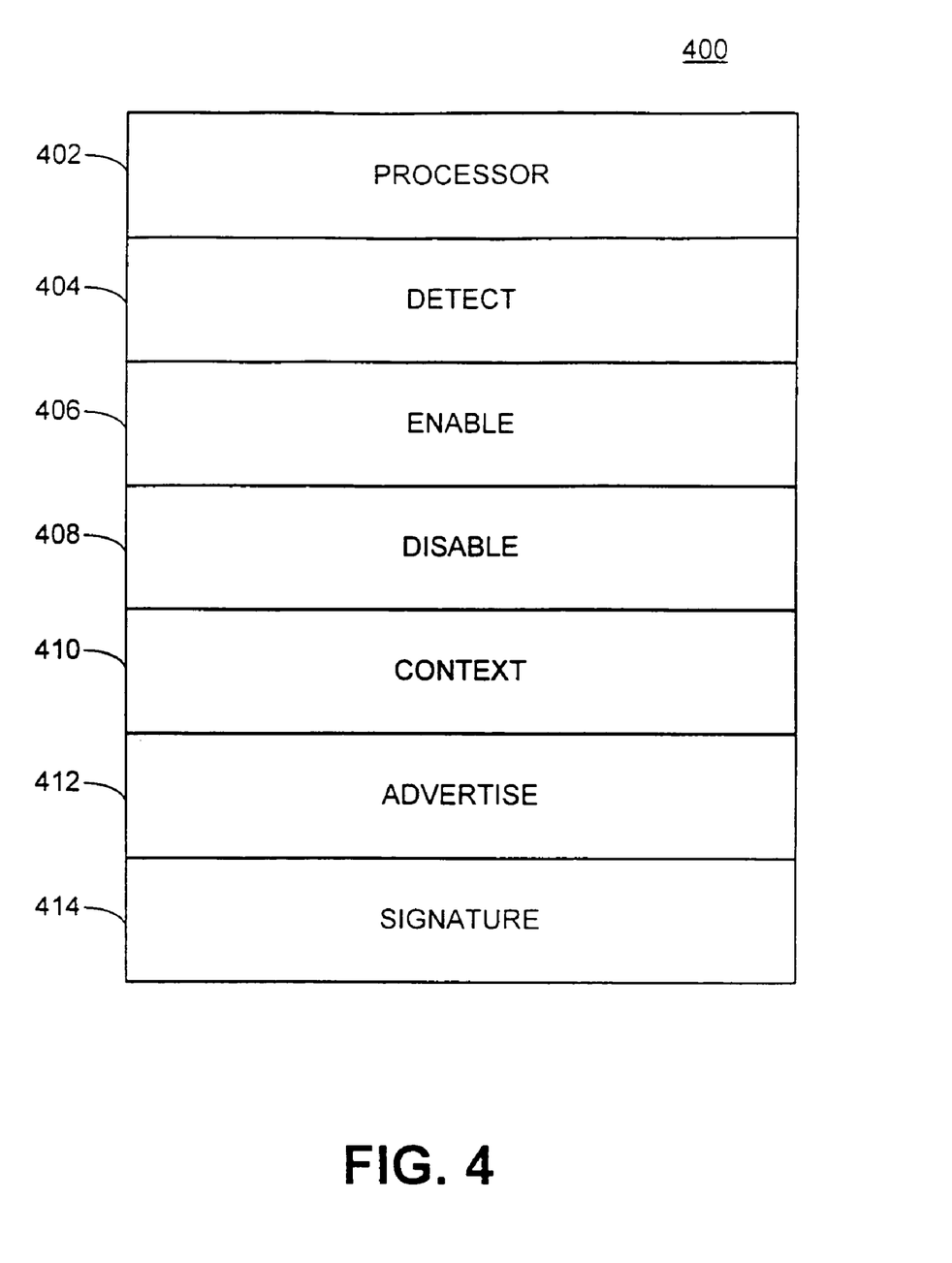
FIG. 4 graphically illustrates a machine readable description of a feature of a processor, in accordance with one embodiment of the present invention.

Machine Readable Description of a Feature of a Processor and Methods for Generating and Processing Same FIG. 4 graphically illustrates one embodiment of a machine readable description of a feature of a processor, in accordance with the present invention. As shown, in the present embodiment, the description comprises a plurality of sections, each of which provides different information about the feature. In one embodiment, the description is embodied as a binary large object (BLOB), however it is understood that in other embodiments the description may be implemented in the form of any other suitable data structure. Although the sections of the description are presented in FIG. 4 in a particular order, it is understood that the order of these sections may differ in other embodiments. Furthermore, other embodiments of the machine readable description may comprise fewer or more sections than those depicted in FIG. 4, and in some cases not all of these sections may be required to describe a given feature.

Referring to FIG. 4, a section 402 of the description 400, referred to herein as the "Processor" section, defines a header for the description that stores information that identifies a type of processor in which the feature is implemented. A kernel may use this information to determine if the feature description applies to the processor on which it is running.

Another section 404 of the description 400, referred to as the "Detect" section, contains information that can be processed to detect presence of the feature within a processor of the identified type. This section may be used by a kernel to detect if the feature is supported by the particular processor on which the kernel is running. In the case of a partitioning kernel, the information in this section may also be used to identify additional registers and/or bits of registers that the partitioning kernel must make visible to a guest operating system in order to expose the feature to the guest.

Another section 406 of the description 400, referred to herein as the "Enable" section, stores information that can be processed to enable operation of the feature within a processor of the identified type. Typically, features within a processor are enabled by setting certain bits in certain registers of the processor. In one embodiment, therefore, the Enable section 406 specifies the values to which such register bits must be set to enable operation of the specified feature. A kernel can then set the appropriate register bits in the processor to the specified values to enable operation of the feature. Conversely, in one embodiment, the feature can be disabled by setting these register bits, in reverse order, to the inverse of the bit values specified in the Enable section 406.

Another section 408 of the description 400, referred to herein as the "Detect" section, may store information that can be processed to disable operation of the feature within a processor of the identified type. For example, just as certain register bits may have to be set to certain values to enable a feature, certain register bits may have to be set to other values to disable a feature. As mentioned above with respect to the Enable section 406, however, it may be possible for a kernel to disable the feature simply by setting the register bits identified in the Enable section 406, in reverse order, to the inverse of the bit values specified in that section. In such a case, it may not be necessary to provide the Detect section. In one embodiment, the omission of a Detect section 408 from the description 400 is interpreted as an indication that the feature can in fact be disabled by setting the register bits identified in the Enable section 406, in reverse order, to the inverse of the values specified in the Enable section 406.

As mentioned above, a new feature of a processor may introduce new registers or add new, previously reserved bits to existing registers. Another section 410 of the description 400, referred to herein as the "Context" section, stores information identifying such new processor state. A kernel may use this information to determine what state must be saved prior to the processor on which it is running switching context, for example, between two threads of execution in the case of a traditional operating system kernel or between two virtual processors in the case of a partitioning kernel. In the case of a partitioning kernel, this information may also be used to identify new registers or register bits that must be handled appropriately to maintain security between partitions.

In order for a kernel to be able to save the additional state identified in the Context section 410, the code that implements the context switching in the kernel (traditional or partitioning) may need to be modified to support variable size thread context and to allow the context to be extended at runtime. Such modifications can be implemented in many ways including, for example, implementing a thread relative, table driven save/restore engine in the kernel or implementing thread specific context switch code that is just-in-time assembled for each thread. The address spaces chosen would allow for a simple assembler in the kernel to build such a code stream to be appended to a library of standard context switch code.

Another section 412 of the description 400, referred to herein as the "Advertise" section, stores an identifier associated with the feature and a textual description of the feature. A kernel may return these values in response to a query from a client requesting information about features available on the processor. A client requesting such information may be an operating system, an application program, or some other program module. With this information, a client could then request that a feature be enabled for its use.

A last section 414 of the description 400, referred to as the "Signature" section, may store a digital signature computed over at least a portion of the data structure. This signature can be processed to confirm the provenance of the data structure. In one embodiment, the signature may comprise a standard RSA digital signature computed over at least a portion of the description 400. In one embodiment, the signature may be signed by a private key associated with the processor vendor. The public key needed to process the signature to verify the provenance of the description could be distributed in a variety of ways. For example, the public key may be embedded within a given processor model. Alternatively, the kernel or other control code executing on a processor may obtain the public key from a database based on the identified vendor of the processor (e.g., the vendor identified by the value returned by CPUID(0).EBX:ECX:EDX in the x86 architecture).

It is understood, however, that other means of delivering the description 400 may provide sufficient security such that the Signature section 414 is not required. For example, a processor vendor could embed a feature description in the processor itself; certain model specific registers (MSRs) could be used for this purpose. Additionally, in a computing system of the type illustrated in FIG. 3, the feature description could be provided as part of the secure loader code 304 within the processor. The present invention is by no means limited to any one delivery mechanism.

FIGS. 5a through 10b provide further details of one embodiment of a format for each of the various sections 402-414 of the processor feature description 400, expressed using the structure notation of the C programming language. In this embodiment, it is assumed that the processor(s) to which the feature description applies implements the x86 or x64 processor architectures. Also in this embodiment, mask and match values are used to indicate the values of specific bits within registers. A mask value identifies which bits of a register are relevant in a given situation, and the match value then specifies a specific value (0 or 1) for those bits. In a comparison operation, a match is made if the following equation, expressed in the C programming language, is satisfied: (Value & Mask)==Match, where Value is the value of the register, Mask identifies which bits are to be compared, and Match specifies the values (0 or 1) of the identified bits. For example, assume that a register has eight bits and that it is desired to know whether the least significant two bits of the register have the binary value '10' (the binary 0 being the least significant bit). The mask value for a compare operation would be '00000011' and the match value would be '00000010'. To perform the comparison, the current value of the register would be read and then a logic AND operation would be performed on the value, bit by bit, with the mask value. The result would then be compared to the match value. This technique can also be used to set specific register values within the processor.

Figure 5A:
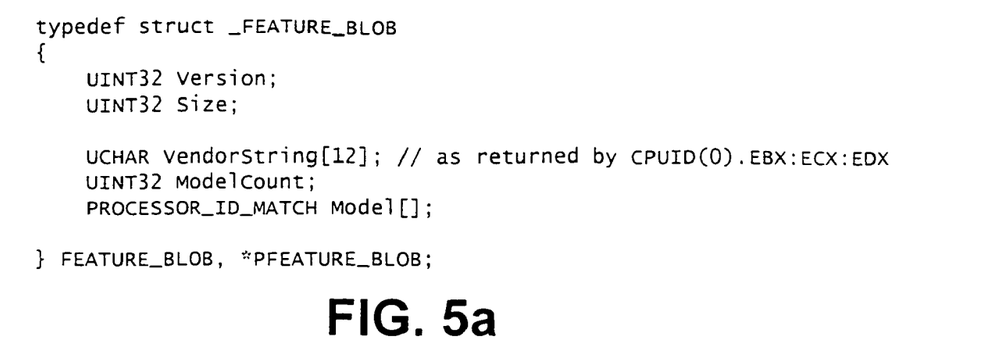
FIGS. 5a and 5b describe one embodiment of a format of a section of the description of FIG. 4.
Figure 5B:
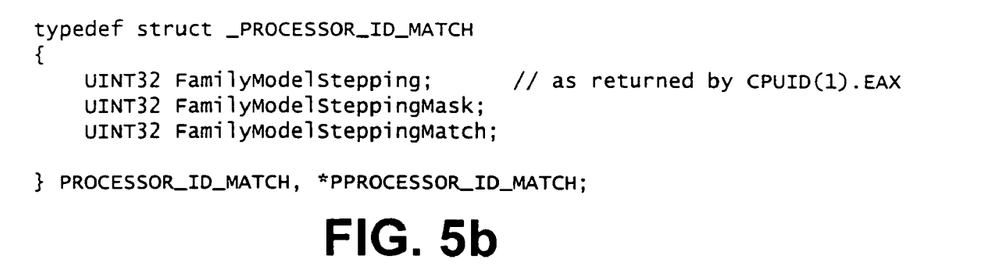

FIGS. 5a and 5b describe one embodiment of a format of the Processor section 402 of the description 400 of FIG. 4. As shown, in this embodiment, the Processor section 402 contains mask and match values for the vendor and processor family/model information that can be obtained from an x86 architecture processor using the CPUID instruction. In this example, the Processor section 402 provides a vendor string, VendorString[12], which can be compared with the string returned by CPUID(0).EBX:ECX:EDX, and a variable length array, Model[ ], that provides processor family, model, and stepping information as returned by CPUID(1).EAX, together with match and mask values to allow wild cards. It is understood, however, that in other embodiments, the Processor section 402 may contain other processor identification information or present the processor identification information in a different format, as appropriate for the processor architecture for which the new feature is being described.

Figure 6:
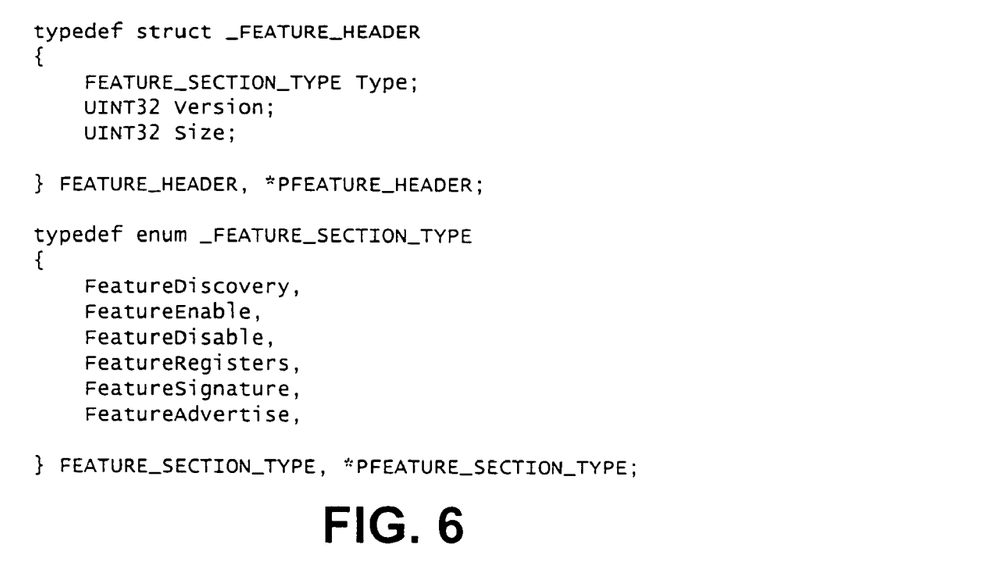
FIG. 6 describes one embodiment of a format of a header that is included in various sections of the machine readable description of FIG. 4.

In the present embodiment, after the Processor section 402, each subsequent section begins with a header that describes its type, size and version. One embodiment of the format of this section header is illustrated in FIG. 6. As shown, in this embodiment, the header may specify the type of the section as:
 FeatureDiscovery—for the Detect section 404;
 FeatureEnable—for the Enable section 406;
 FeatureDisable—for the Disable section 408;
 FeatureRegisters—for the Context section 410;
 FeatureAdvertise—for the Advertise section 412; and
 FeatureSignature—for the Signature section 414.

Figure 7A:
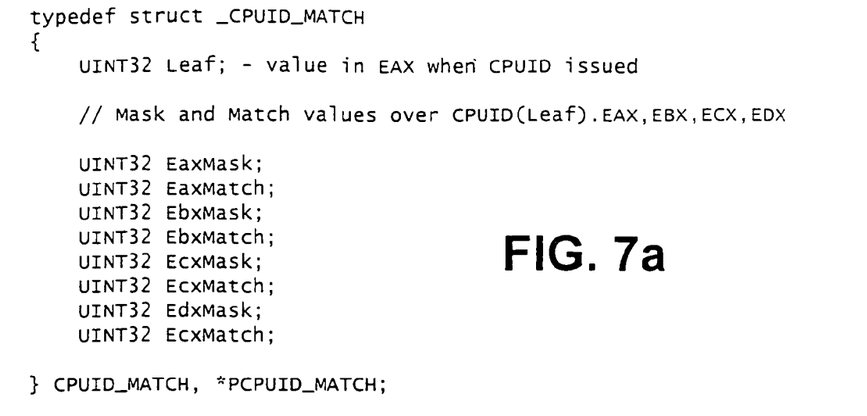
FIGS. 7a through 7d together describe one embodiment of a format of certain fields of the sections illustrated in FIGS. 8 and 9.
Figure 7B:
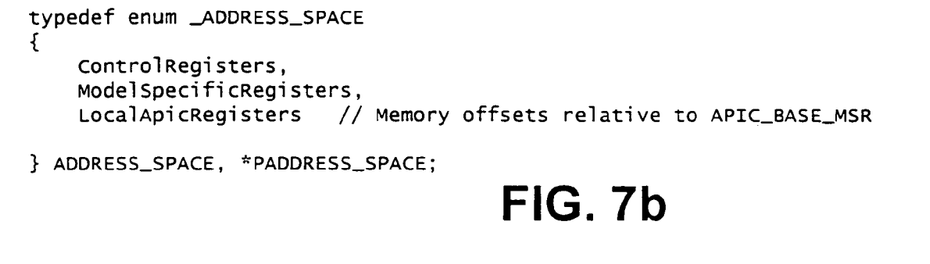
Figure 7C:
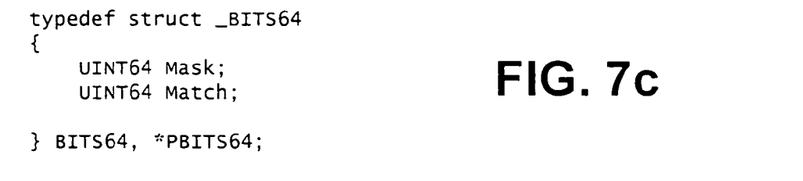
Figure 7D:
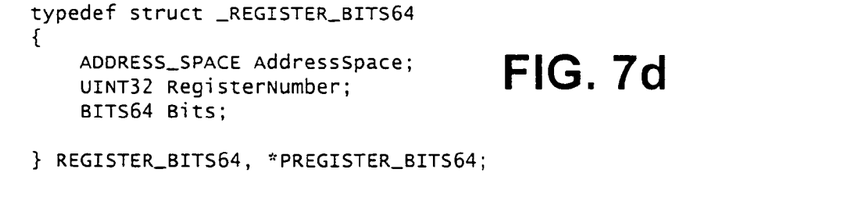
Figure 8:
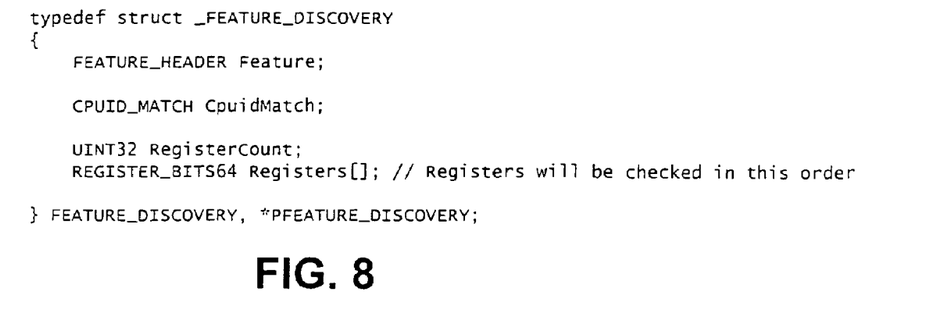
FIG. 8 describes one embodiment of a format of yet another section of the description of FIG. 4.

FIG. 8 describes one embodiment of a format of the Detect section 404 of the description 400 of FIG. 4. In the x86 and x64 processor architectures, the CPUID instruction can be used to request information about the features of a processor. New features are often indicated by a flag set in one of the CPUID leaves that return data in the EAX, EBX, ECX and EDX general purpose registers of the processor, which are four of the eight or sixteen general purpose registers, depending on mode, provided by the processor. Processor features may also be indicated by certain bits of other registers in the processor, such as certain control registers, certain model specific registers (MSRs) or certain local APIC registers (memory offsets relative to APIC_BASE_MSR). Accordingly, in the embodiment illustrated in FIG. 8, after the header, the Detect section 404 may include a CpuidMatch field containing mask and match values for a particular leaf of the CPUID information in the processor and/or may also include a Registers[ ] array, each entry of which contains mask and match values for a given register in the processor. When checking the specific bits of the registers specified in the Registers[ ] array, the registers are checked in the order presented in the array. FIGS. 7a through 7d describe various data structures that define the format of the CpuidMask field and individual entries of the Registers[ ] array of the Detect section of FIG. 8.

Specifically, FIG. 7a describes a CPUID_MATCH data structure that defines the format of the CpuidMatch field of the Detect section 404. The Leaf field of the structure specifies the value in register EAX when the CPUID is issued, and the subsequent fields specify the mask and match values to be applied over the values returned by the processor in the EAX, EBX, ECX and EDX registers in response to the CPUID instruction.

FIGS. 7b through 7d collectively describe data structures that define the format of each entry of the Registers[ ] array of the Detect section 404. The present embodiment recognizes that processor registers in the x86 and x64 architectures may exist in several address spaces, including for example, the address space of the control registers (CRx), the address space of the model specific registers (MSR[x]) in the processor, and local APIC registers that reside at memory offsets relative to the APIC_BASE_MSR register. Accordingly, FIG. 7b defines an enumeration called ADDRESS_SPACE that can be used to indicate the address space to which a particular set of mask and match values pertains. FIG. 7c defines a data structure called BITS64 that has Mask and Match fields that hold the mask and match values, respectively, for the sixty-four bits of a given register. In the present embodiment, a relevant bit is indicated by a 1 in the Mask field and its value is indicated in the same bit position in the Match field. The ADDRESS_SPACE enumeration and BITS64 data structure can then be combined in the REGISTER_BITS64 data structure described in FIG. 7c to define the format for indicating mask and match values for a specific register of the processor. The RegisterNumber field specifies the offset of the particular register within the address space identified in the AddressSpace field. The format of the REGISTER_BITS64 data structure is the format used in each entry of the Registers[ ] array of the Detect section 404 illustrated in FIG. 8.

Thus, one or both of the CpuidMask field and Register[ ] array of the Detect section 404 can be used by a kernel to check for the presence of the particular feature to which a description 400 pertains. Once the presence of the feature is confirmed, the Enable section 406 provides information that a kernel can use to enable operation of the feature.

Figure 9A:
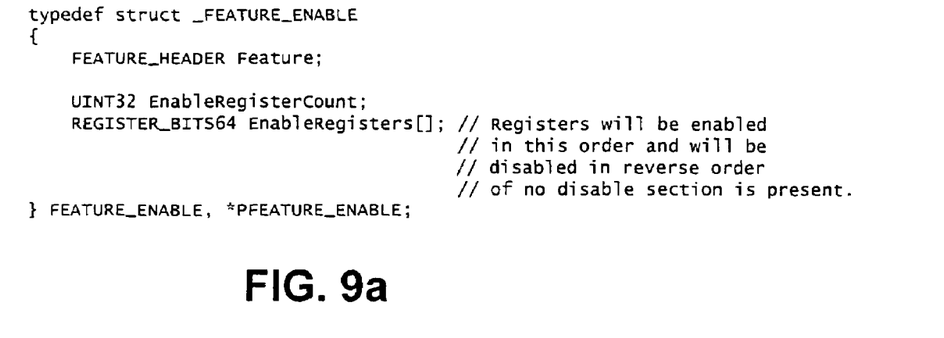
FIG. 9a describes one embodiment of a format of another section of the description of FIG. 4.

FIG. 9a describes one embodiment of a format of the Enable section 406 of the description 400 of FIG. 4. As shown, after the header, the Enable section 406 contains an EnableRegisters[ ] array, each entry of which provides match and mask values for certain bits of a register that must be set in order for the feature to become operational in the processor. Each of the EnableRegisters[ ] array is defined as having the same format—REGISTER_BITS64—as the entries in the Registers[ ] array of the Detect section 404. A kernel can thus enable operation of the described feature by setting the identified register bits, in the order presented in the EnableRegisters[ ] array, to the specified values in the Match fields of the array entries. Conversely, in this embodiment, the feature can be disabled by setting the bits, in reverse order, to the inverse of the values specified in the Match fields of the array entries. In the case of a partitioning kernel, the partitioning kernel can use the register mask values to indicate bits that should be made visible to a guest operating system to allow the guest operating system to enable the feature. These mask values can also be used by the partitioning kernel to check whether the feature has in fact been enabled, so that it can be sure to preserve any new state associated with the feature during a context switch from one partition to another. As mentioned above, it is the Context section 410 that specifies the new state associated with the feature.

Figure 9B:
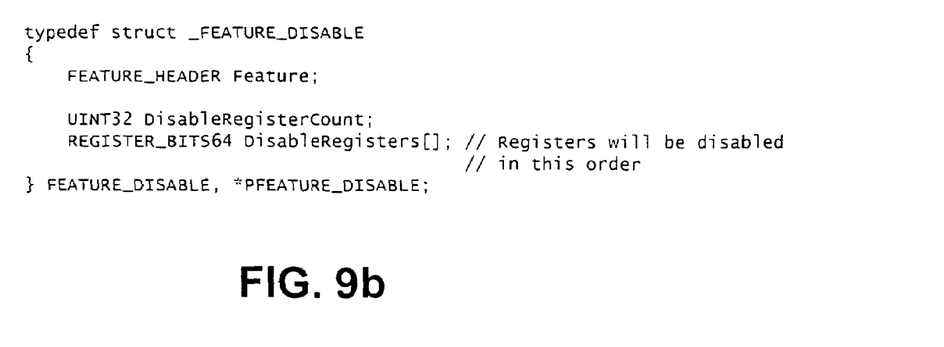
FIG. 9b describes one embodiment of yet another section of the description of FIG. 4.

FIG. 9*b* describes one embodiment of a format of the Disable section 408 of the description 400 of FIG. 4. In this embodiment, it generally is formatted in the same way as the Enable section 406.

Figure 10A:
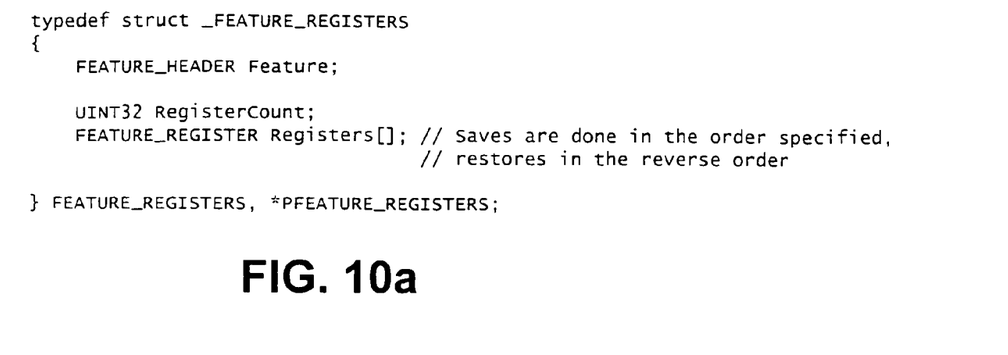
FIGS. 10a and 10b together describe one embodiment of a format of still another section of the description of FIG. 4.
Figure 10B:
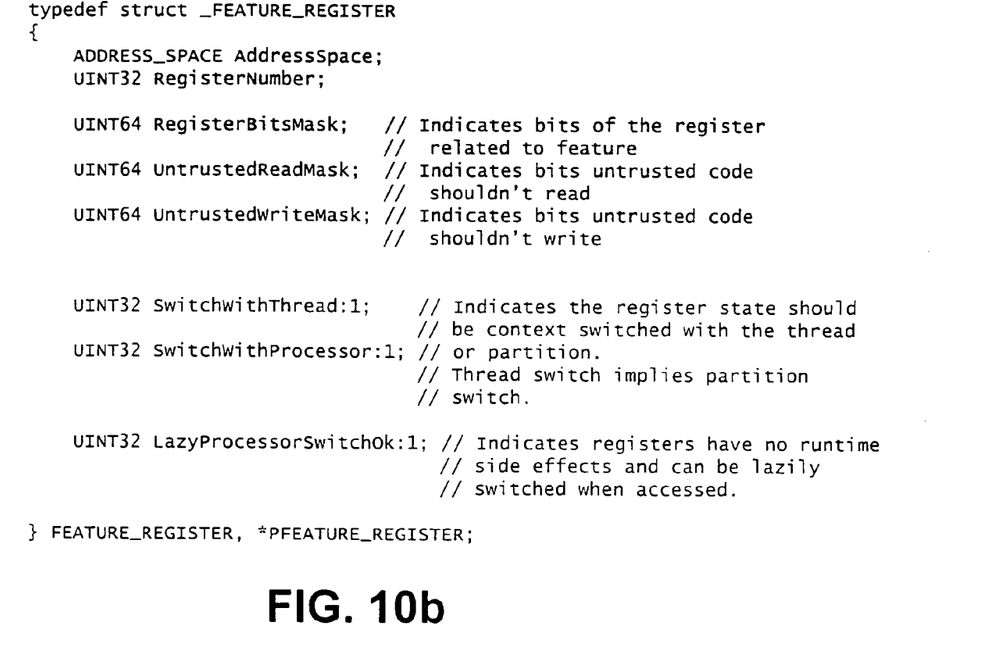

FIGS. 10*a* and 10*b* together describe one embodiment of a format of the Context section 410 of the description of FIG. 4. As shown in FIG. 10, after the header, the Context section contains a Registers[ ] array containing an entry for each register of the processor that contains bits (i.e., state) associated with the new feature. FIG. 10*b* specifies the format of each entry of the Registers[ ] array of the Context section, in accordance with the present embodiment.

As shown in FIG. 10*b*, an entry of the Registers[ ] array may contain an indication of the address space (e.g., control register, model specific register, local APIC register) of the register being identified, a RegisterNumber field that specifies the offset of the register within the identified address space, and a RegisterBitsMask field that indicates the bits of the register that are relevant to the new feature. For use with traditional operating system kernels, the present embodiment may further comprise a SwitchWithThread flag that is used to indicate whether the identified bits (i.e., state) of the register are to be saved during a context switch from one thread of execution to another. For use with partitioning kernels, the present embodiment may further comprise a SwitchWithProcessor flag that can be used to indicate whether the identified bits are to be saved during a context switch from one virtual processor to another. A LazyProcessorSwitchOk flag may also be included to indicate whether it is only safe to do so lazily when a different virtual processor attempts to access the state associated with the new feature. Also, to support the ability of a partitioning kernel to control access to the bits by a guest operating system, the entry may further comprise UntrustedReadMask and UntrustedWriteMask fields that can be used to indicate bits that the partitioning kernel should prevent untrusted code from reading or writing, respectively.

Figure 11:
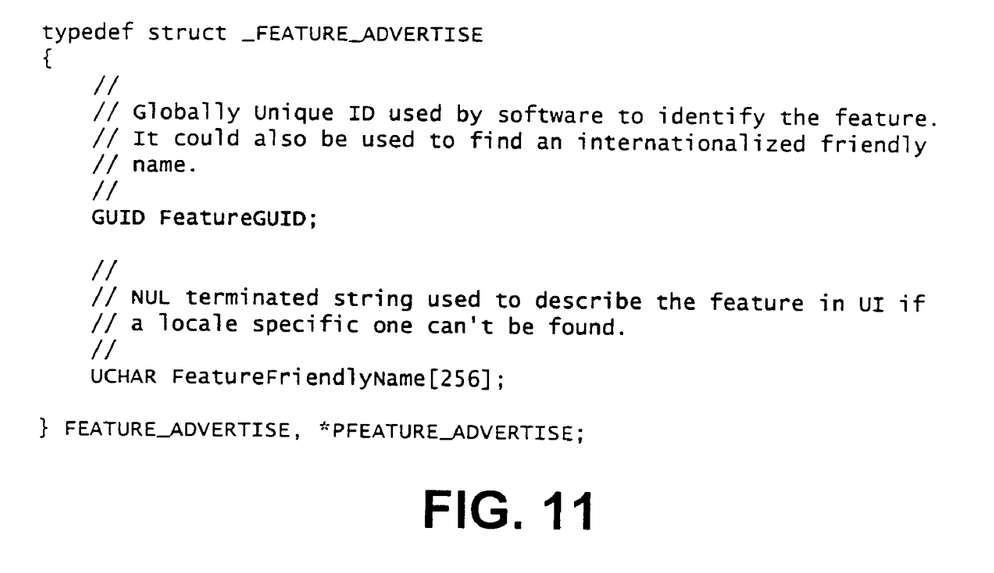
FIG. 11 describes one embodiment of a format of another section of the description of FIG. 4.

FIG. 11 describes one embodiment of a format for the Advertise section 412 of the description 400 of FIG. 4. As shown, the advertise section may comprise a FeatureGUID field that stores a globally unique identifier (GUID) associated with the feature and a FeatureFriendlyName field that can hold, for example, up to 256 characters of a textual description of the feature. As mentioned above, the information in these fields may be returned by a kernel in response to a query from a client requesting information about features of the processor. With this information, a client may then request that a feature be enabled or disabled by the kernel.

Figure 12:
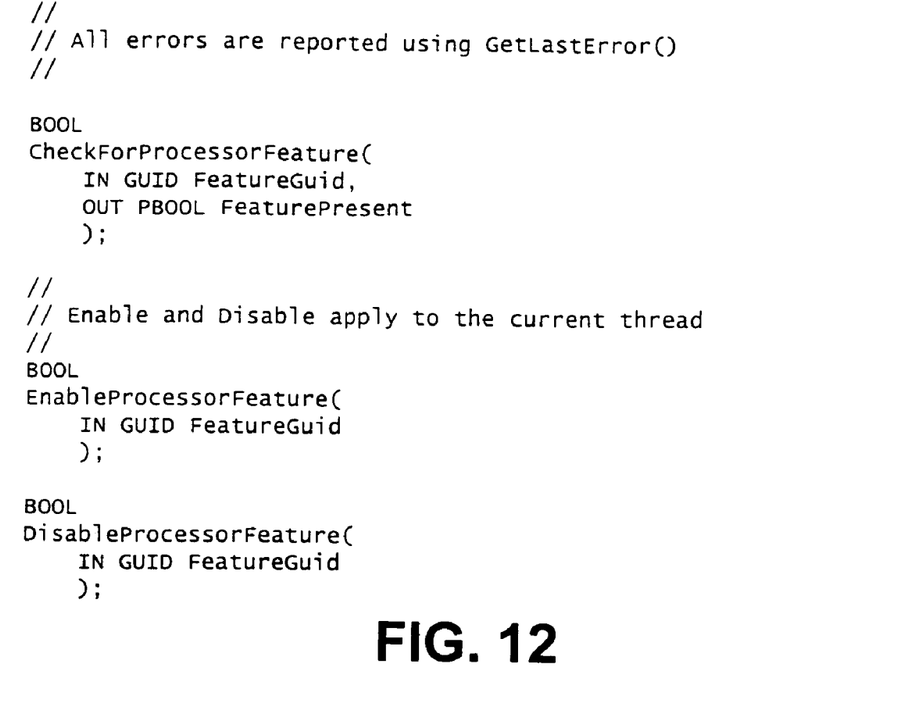
FIG. 12 describes an exemplary application programming interface (API) that can be provided to expose a processor feature to an application program and to allow the application program to request that the feature be enabled.
Figure 13:
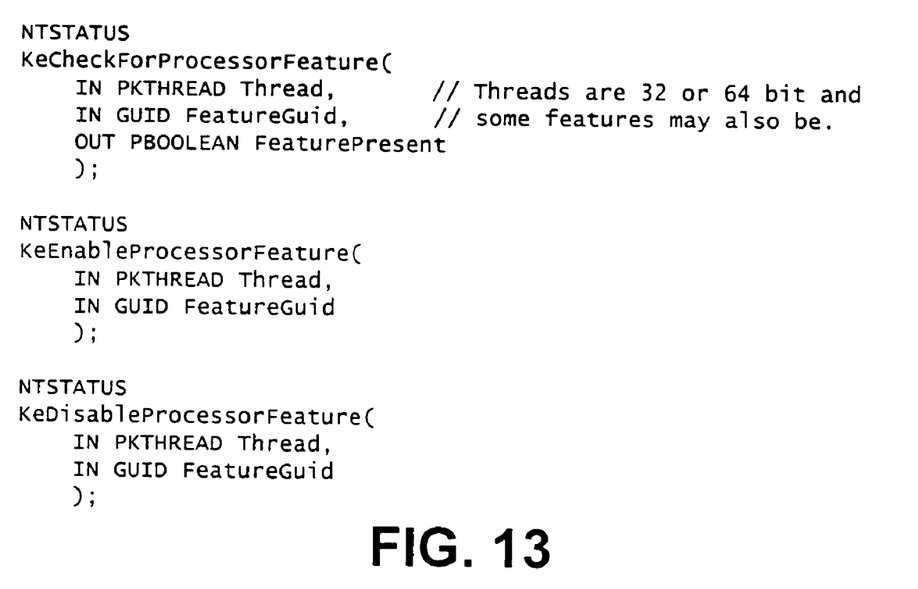
FIG. 13 describes a similar API that can be provided by an operating system kernel to expose a processor feature to drivers and other kernel mode program modules and to allow those modules to request that the feature be enabled.

FIG. 12 describes an exemplary application programming interface (API) that could be provided by an operating system to expose processor features to an application program and to allow the application program to request that the feature be enabled on a thread by thread basis. In this example, the API is expressed in the form of a Win32 API. FIG. 13 illustrates an exemplary API that could be included as part of an operating system kernel, such as the kernel of the WINDOWS® operating systems available from Microsoft Corporation, to expose a processor feature to drivers and other kernel mode program modules and to allow those modules to request enablement of the feature on a thread by thread basis.

The present invention encompasses the method by which an entity, such as a processor vendor, generates a machine readable description of a processor feature and then distributes the machine readable description so that it can be received and processed by a computing system. It is submitted that a separate Figure illustrating the steps of such a method is not necessary, as the steps of the method simply comprise writing the information contained in the various sections of the description described above in a machine-readable form. Such method steps may be performed by the entity manually, or such steps could be performed in an automated fashion by program code that, when executed by a computing system, causes the system to write the various machine readable sections of the description. Moreover, the present invention also encompasses a computer readable medium having stored thereon a data structure comprising all or some of the various sections of information described above.

Figure 14:
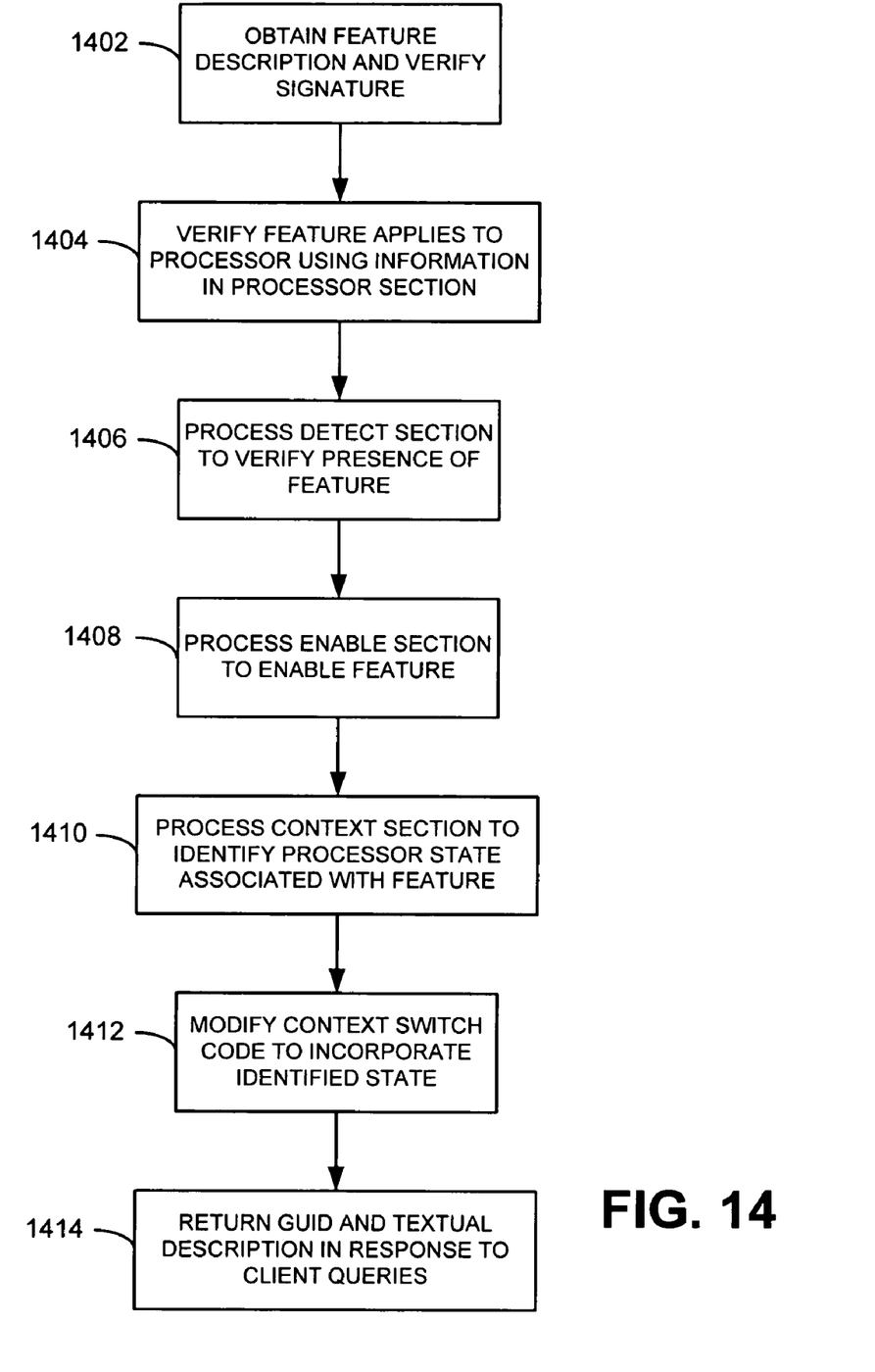
FIG. 14 is a flow diagram illustrating one embodiment of a method of processing a description of a feature of a processor, in accordance with the present invention.

FIG. 14 is a flow diagram illustrating one embodiment of a method of processing a description of a feature of a processor, in accordance with the present invention. In the embodiment illustrated in FIG. 14, it is assumed that the description being processed has the format illustrated in FIGS. 4 and 5*a* through 11. It is understood, however, that the method may also be performed using a description containing the same information but in a different format. The functionality defined by the method may be implemented in a variety of forms, such as implemented as part of a traditional operating system kernel, as part of a partitioning kernel, or as part of some other control code that executes on a processor for which a feature description is provided.

As shown in FIG. 14, at step 1402, a machine readable description of a processor feature is accessed by program code, such as a kernel or other control code, executing on a processor of a computing system. In an embodiment in which the machine readable description includes a Signature section 414, this step may further comprise processing a digital signature contained in the Signature section using a public key associated with the vendor of the processor on which the program code is executing to verify the provenance of the description. As mentioned above, in the case of the x86 and x64 architectures, the processor vendor may be identified in the string returned as a result of executing a CPUID(0) instruction on the processor. This identification could then be employed to look up a public key associated with the vendor. In other embodiments, the public key of the vendor may be retrieved from an embedded storage location within the processor itself. The present invention is not limited to any one method of obtaining the public key associated with the processor vendor.

Assuming that the provenance of the description is confirmed, at step 1404 the information provided in the Processor section 402 of the description is used to verify that the processor of the computing system is of the type identified in that section. Specifically, in the present embodiment, the mask and match values in the VendorString[ ] field and Model[ ] array are compared against the values returned by CPUID(0).EBX:ECX:EDX and CPUID(1).EAX, respectively, to verify that the processor on which the program code is running is one to which the feature description applies.

Next, at step 1406, the information provided in the Detect section 404 is used to detect the presence of the feature within the processor of the computing system. Specifically, in the present embodiment, the mask and match values specified in CpuidMatch field and Registers[ ] array of the Detect section 404 are applied against the actual bits of the processor to ensure that the feature is present in the processor. In a partitioning kernel this information is used to allow guest operating systems access to the register bits and/or CPUID leaves required to allow the guest operating system to detect the feature if it desires.

Assuming that the feature is present, at step 1408, the information provided in the Enable section 406 of the description may be used to enable operation of the feature within the processor of the computing system. Specifically, the mask and match values specified in the entries of the EnableRegisters[ ] array are used to set the appropriate bits in the specified registers in order to enable the feature within the processor. As discussed above, the information may also be used to disable the feature. In a partitioning kernel this information is used to allow guest operating systems access to the register bits required so that the guest operating system can enable the feature if it desires.

Next, at step 1410, the information provided in the Context section 410 of the description may be used to identify state within the processor that is associated with the feature. The information in this section may also be used to determine whether the identified state is to be saved prior to the processor of the computing system switching context between two threads of execution or between two virtual processors in a partitioned computing system. In a partitioning kernel this information is used to allow guest operating systems access to the state bits.

Finally, step 1414 may be performed to extract an identifier associated with the feature and a textual description of the feature from the description. In the present embodiment, this involves extracting the GUID from the FeatureGUID field of the Advertise section 412 of the description and the textual description from the FeatureFriendlyName field. As mentioned above, this information may be returned in response to a query from a client for information about the new processor feature. The unique identifier associated with the feature may also be used by a client to request that a feature be enabled. Such a client could use one of the APIs illustrated in FIGS. 12 and 13 for this purpose.

One example of an existing processor feature for which a machine readable description of the present invention could have been employed is the PAE (Physical Address Extension) feature implemented in the x86 architecture. The PAE feature is detected using a CPUID feature bit (CPUID(2).EDX[13]==1) and is enabled when a PGE bit (bit 7) in control register CR4 is set. This feature allows an operating system kernel to indicate address translations that are global across all page tables. A machine readable description of this feature could have contained a Detect section specifying mask and match values to determine whether the CPUID(2).EDX[13] bit is set to 1, and an Enable section 406 providing mask and match values that could be used to set the value of control register bit CR4[7] to 1. As there is no additional processor state associated with the feature (other than the control registers that are already defined to be saved across context switches), no Context section would be required.

Another example of a processor feature for which a machine readable description of the present invention could have been employed is the addition of the SYSENTER and SYSEXIT system call instructions that were added to the x86 architecture. These instructions can be used by ring-3 applications to quickly call a ring-0 kernel. As part of the addition of these new instructions, three new model specific registers were defined in the processor architecture to hold the entry point address, code segment and stack for the kernel. In a computing system employing a partitioned kernel, this new state would need to be saved across context switches between virtual processors in different partitions. The feature is present when the CPUID(2).EDX[21] is set to a value of 1. A machine readable description of the new feature could have included a Detect section 404 with mask and match values to determine whether the CPUID(2).EDX[21] bit is set, and a Context section 410 that identifies the three MSRs associated with the feature (i.e., MSR[0x174], MSR[0x175] and MSR[0x176]). In this case, each of the MSRs would be marked with SwitchWithProcessor flag and would have the UntrustedReadMask and UntrustedWriteMask fields set to allow all bits to be read/written by a guest operating system.

All or portions of the methods of the present invention described above may be embodied in hardware, software, or a combination of both. When embodied in software, the methods of the present invention, or certain aspects or portions thereof, may be embodied in the form of program code that when executed by a computing system cause the computing system to perform the methods of the present invention. This program code may be stored on any computer-readable medium, as that term is defined above.

As the foregoing illustrates, the present invention is directed to a machine readable description of a new feature of a processor, a method of generating same, and a method of using the machine readable description to detect, enable and manage operation of the feature in a computing system. It is understood that changes may be made to the embodiments described above without departing from the broad inventive concepts thereof. Accordingly, it is understood that the present invention is not limited to the particular embodiments disclosed, but is intended to cover all modifications that are within the spirit and scope of the invention as defined by the appended claims.

What is claimed is:

1. A method for enabling use of a feature of a physical processor of a computing system, the method comprising:
    receiving a machine readable description of the feature, the description comprising a plurality of sections;
    using information provided in a section of the description to identify a type of physical processor in which the feature is implemented and verifying that the physical processor of the computing system is of the identified type;
    using information provided in another section of the description to detect the presence of the feature within the physical processor of the computing system;
    using information provided in the description to determine whether to make detection and subsequent operation of the feature available to at least one of a plurality of guest operating systems in a computing system; and
    using information provided in another section of the description to enable operation of the feature within the physical processor of the computing system.

2. The method of claim 1, further comprising using information provided in another section of the description to disable operation of the feature within the physical processor of the computing system.

3. The method of claim 1, further comprising using information provided in another section of the description to identify state within the physical processor that is associated with the feature.

4. The method of claim 3, further comprising using the information to determine whether to save the identified state during a processor context switch.

5. The method of claim 1, wherein the description comprises another section containing an identifier associated with the feature and a textual description of the feature, and wherein the method comprises responding to a query from a client by returning the identifier and the textual description to the client.

6. The method of claim 1, wherein the description comprises another section containing a digital signature computed over at least a portion of the description, and wherein the method further comprises processing the digital signature to confirm the provenance of the description.

7. A computer-readable physical storage medium having program code stored thereon, the program code, when executed by a computing system, causing the computing system to perform the steps recited in claim 1.

8. A computer readable physical storage medium having a data structure stored thereon that contains a machine readable description of a feature implemented in a physical processor, the data structure comprising:
   a section that stores information that identifies a type of physical processor in which the feature is implemented; and
   another second section containing information that can be processed by at least one of a plurality of guest operating systems in a computing system to detect presence of the feature within a physical processor of the identified type; and
   another section that stores information that can be processed to enable operation of the feature within a physical processor of the identified type.

9. The computer readable physical storage medium of claim 8, wherein the data structure comprises a binary large object.

10. The computer-readable physical storage medium of claim 8, wherein the data structure further comprises another section that stores information that can be processed to disable operation of the feature within a physical processor of the identified type.

11. The computer-readable physical storage medium of claim 8, wherein the data structure further comprises another section that stores information identifying state within a physical processor of the identified type that is associated with the feature.

12. The computer-readable physical storage medium of claim 8, wherein the data structure further comprises another section that stores an identifier associated with the feature and a textual description of the feature.

13. The computer-readable physical storage medium of claim 8, wherein the data structure further comprises another section that stores a digital signature computed over at least a portion of the data structure that can be processed to confirm the provenance of the data structure.

14. A method for providing a computer readable description of a feature implemented in a processor comprising:
   storing first information that identifies a type of physical processor in which the feature is implemented; and
   storing second information that can be processed by a computing system to detect presence of the feature within a physical processor of the computing system;
   storing additional information that can be processed by a computing system to enable the feature within a physical processor of the computing system; wherein the first, second and additional information provided in the computer-readable description determines whether to make detection and subsequent operation of the feature available to at least one of a plurality of guest operating systems in a computing system.

15. The method of claim 14, further comprising storing additional information identifying state within a physical processor of the identified type that is associated with the feature.

16. The method of claim 14, further comprising storing an identifier associated with the feature and a textual description of the feature.

17. The method of claim 14, further comprising computing a digital signature over at least a portion of the data structure and storing the digital signature.

* * * * *

UNITED STATES PATENT AND TRADEMARK OFFICE
CERTIFICATE OF CORRECTION

PATENT NO. : 7,716,638 B2
APPLICATION NO. : 11/072913
DATED : May 11, 2010
INVENTOR(S) : Andrew J. Thornton It is certified that error appears in the above-identified patent and that said Letters Patent is hereby corrected as shown below:

In column 11, line 2, after "Each" insert -- entry --.

Signed and Sealed this
Eighth Day of February, 2011

David J. Kappos
*Director of the United States Patent and Trademark Office*